(12) United States Patent
Hanlon et al.

(10) Patent No.: US 8,146,886 B2
(45) Date of Patent: Apr. 3, 2012

(54) HIGH ACCURACY, ZERO BACKLASH ROTARY-TO-LINEAR ELECTROMECHANICAL ACTUATOR

(75) Inventors: Casey Hanlon, Queen Creek, AZ (US); Steve Abel, Chandler, AZ (US); David M. Eschborn, Gilbert, AZ (US); Doug Kortum, Mesa, AZ (US); Don Christensen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 428 days.

(21) Appl. No.: 12/535,511

(22) Filed: Aug. 4, 2009

(65) Prior Publication Data

US 2011/0031424 A1    Feb. 10, 2011

(51) Int. Cl.
*F16K 31/00* (2006.01)
(52) U.S. Cl. .................................. 251/294; 251/129.11
(58) Field of Classification Search ............. 251/129.11, 251/129.12, 129.13, 129.2, 294
See application file for complete search history.

(56) References Cited

U.S. PATENT DOCUMENTS

| | | | |
|---|---|---|---|
| 2,808,849 A * | 10/1957 | Pottmeyer | 137/309 |
| 3,889,169 A | 6/1975 | Hirschman et al. | |
| 3,955,792 A * | 5/1976 | Cho | 251/69 |
| 4,523,737 A * | 6/1985 | Wentworth | 251/4 |
| 5,432,421 A | 7/1995 | Kessler et al. | |
| 6,062,534 A * | 5/2000 | Eggleston | 251/58 |
| 6,263,898 B1 * | 7/2001 | Vanderveen et al. | 137/15.25 |
| 6,566,777 B2 | 5/2003 | AbuAkeel | |
| 6,665,554 B1 | 12/2003 | Charles et al. | |
| 6,772,655 B2 | 8/2004 | Poehlau | |
| 6,809,488 B2 | 10/2004 | Otte | |
| 6,850,018 B2 | 2/2005 | Zacher et al. | |
| 6,929,241 B2 * | 8/2005 | Holloway, Jr. | 251/129.11 |
| 6,940,245 B2 | 9/2005 | Scarlet et al. | |
| 7,038,338 B2 | 5/2006 | Sesselmann et al. | |
| 7,141,943 B2 | 11/2006 | Song et al. | |
| 7,334,773 B2 * | 2/2008 | Stout et al. | 251/294 |
| 7,453,176 B2 | 11/2008 | Davison | |
| 7,464,775 B2 | 12/2008 | Clemens et al. | |
| 7,486,042 B2 | 2/2009 | Potter et al. | |
| 2004/0135530 A1 | 7/2004 | Liu et al. | |
| 2004/0163869 A1 | 8/2004 | Chun et al. | |
| 2008/0278015 A1 | 11/2008 | Reisinger | |

* cited by examiner

*Primary Examiner* — John Fristoe, Jr.
(74) *Attorney, Agent, or Firm* — Ingrassia Fisher & Lorenz, P.C.

(57) ABSTRACT

An electromechanical actuator is provided for converting rotary action into linear action, and includes an electric motor, a cable yoke, an output shaft, and a pair of cables. The electric motor is adapted to be selectively energized and is configured, upon being energized to generate a drive torque. The cable yoke is coupled to receive the drive torque and is configured, upon receipt thereof, to rotate about a rotational axis. The output shaft is coupled to receive a drive force and is configured, upon receipt thereof, to translate along a linear axis that is disposed at least substantially perpendicular to the rotational axis. Each cable is wound, in pretension, on a portion of the cable yoke and around a portion of the output shaft. The pair of cables is configured, upon rotation of the cable yoke, to supply the drive force to the output shaft.

15 Claims, 9 Drawing Sheets

HIGH ACCURACY, ZERO BACKLASH ROTARY-TO-LINEAR ELECTROMECHANICAL ACTUATOR

TECHNICAL FIELD

The present invention generally relates to actuators, and more particularly relates to a rotary-to-linear electromechanical actuator that exhibits relatively high accuracy and zero backlash.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various components. No matter the specific end-use, actuators are many times classified based on the power source that is used to effect actuation. For example, actuators are many times classified as hydraulic-, pneumatic-, or electrically-operated (or electromechanical) actuators.

Electromechanical actuators typically include an electric motor that is used to supply a drive torque to an actuated element, such as a valve. In many instances, it is desirable to convert the rotation of electric motor to linear movement to move the actuated element in a linear direction. For example, in the context of a projectile, it may be desirable to selectively move a pintle valve in a linear direction to effect attitude control. In such contexts, it is additionally desirable to physically implement an electromechanical actuator that has a relatively small size and low weight. In the past, these goals have been met by using a relatively small electric motor that rotates at a relatively high rotational speed, and then including some type of gear reduction to increase the output torque of the actuator.

Although the above-described approach generally works well, it does exhibit certain drawbacks. For example, the gear reduction that may be needed to achieve the desired torque output may cause the size and/or weight of the actuator to be higher than desired. Moreover, in some instances, the electromechanical actuators do not exhibit a sufficient level of precision and/or exhibit excessive backlash.

Hence, there is a need for an electromechanical actuator that includes a small, high speed motor with sufficient gear reduction that has a relatively small space envelope and/or relatively smaller weight as compared to known electromechanical actuator configurations, and/or exhibits relatively high precision and/or does not exhibit excessive backlash. The present invention addresses one or more of these needs.

BRIEF SUMMARY

In one exemplary embodiment, an electromechanical actuator includes an electric motor, a cable yoke, an output shaft, and a pair of cables. The electric motor is adapted to be selectively energized and is configured, upon being energized to generate a drive torque. The cable yoke is coupled to receive the drive torque and is configured, upon receipt thereof, to rotate about a rotational axis. The output shaft is coupled to receive a drive force and is configured, upon receipt thereof, to translate along a linear axis that is disposed at least substantially perpendicular to the rotational axis. Each cable is wound, in pretension, on a portion of the cable yoke and around a portion of the output shaft. The pair of cables is configured, upon rotation of the cable yoke, to supply the drive force to the output shaft.

In another exemplary embodiment, an electromechanical actuator includes a brushless DC motor, a harmonic drive gear train, a cable yoke, an output shaft, a pair of cables, a position sensor, and a motor control. The brushless DC electric motor is adapted to be selectively energized and is configured, upon being energized to generate a drive torque. The harmonic drive gear train is coupled to receive the drive torque from the motor and, upon receipt thereof, supply a reduced-speed drive torque. The cable yoke is coupled to receive the reduced-speed drive torque from the harmonic drive gear train and is configured, upon receipt thereof, to rotate about a rotational axis. The output shaft is coupled to receive a drive force and is configured, upon receipt thereof, to translate along a linear axis that is disposed at least substantially perpendicular to the rotational axis. Each cable is wound, in pretension, on a portion of the cable yoke and around a portion of the output shaft. The pair of cables is configured, upon rotation of the cable yoke, to supply the drive force to the output shaft. The position sensor is coupled to the output shaft and is configured to sense a position of the output shaft and supply a position signal representative thereof. The motor control is coupled to receive the position signal from the position sensor and is configured to commutate the brushless DC motor using the position signal.

In yet another exemplary embodiment, a valve control system includes a valve and an actuator. The valve is coupled to receive a translational drive force and is operable, upon receipt thereof, to selectively move, along a linear axis, between a closed position and a plurality of open positions. The actuator is coupled to the valve and is configured to supply the translational drive force thereto. The actuator includes an electric motor, a cable yoke, an output shaft, and a pair of cables. The electric motor is adapted to be selectively energized and is configured, upon being energized, to generate a drive torque. The cable yoke is coupled to receive the drive torque and is configured, upon receipt thereof, to rotate about a rotational axis. The output shaft is coupled to the valve, and is further coupled to receive a drive force and is configured, upon receipt thereof, to translate along the linear axis, which is disposed at least substantially perpendicular to the rotational axis, and supply the translation drive force to the valve. Each cable is wound, in pretension, on a portion of the cable yoke and around a portion of the output shaft. The pair of cables is configured, upon rotation of the cable yoke, to supply the drive force to the output shaft.

Furthermore, other desirable features and characteristics of the actuator and valve control system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
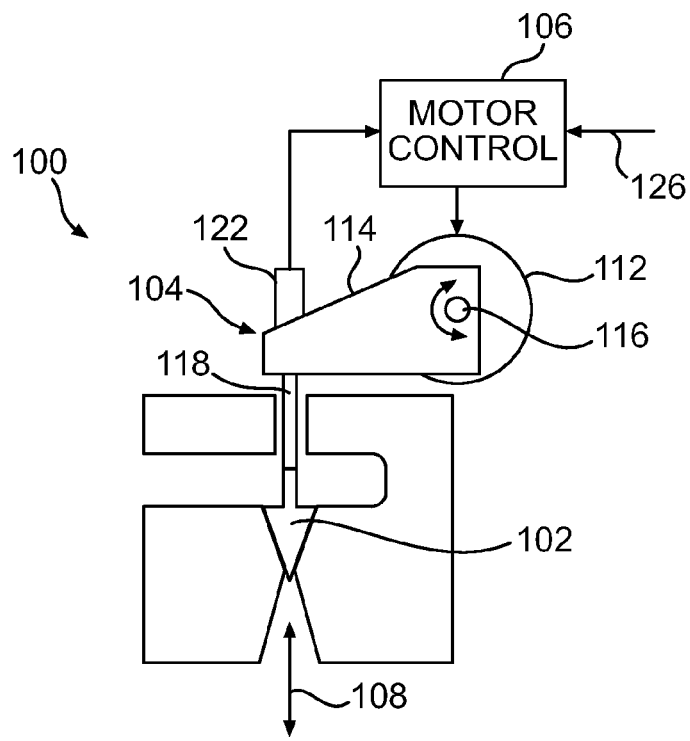
FIGS. 1 and 2 depict simplified schematic representation of an exemplary embodiment of a valve control system according to the present invention, and with the depicted valve in a closed and open position, respectively.
Figure 2:
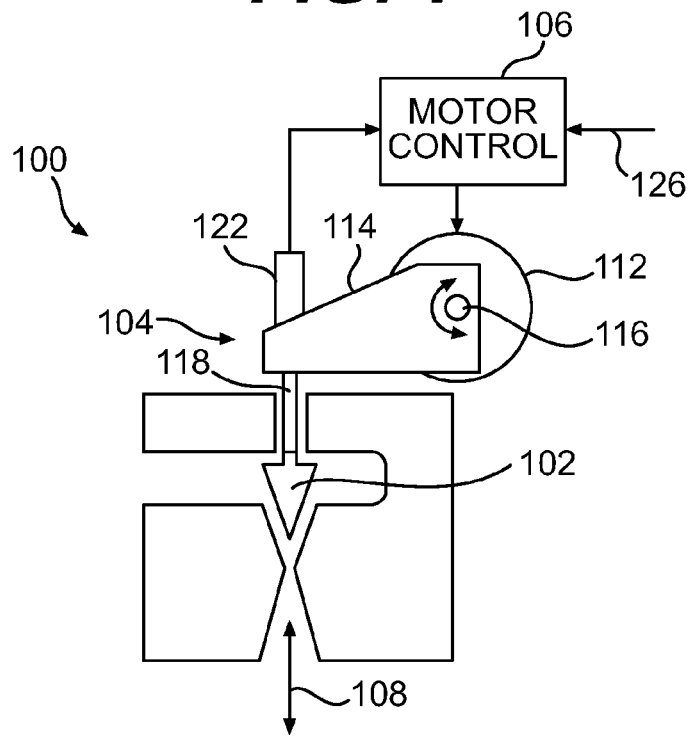

Turning now to the description and with reference first to FIG. 1, a schematic representation of an exemplary embodiment of a valve control system 100 is depicted. The valve control system 100 includes a valve 102, an actuator 104, and a motor control 106. The valve 102 is coupled to receive a translational drive force from the actuator 104 and is operable, upon receipt of the translational drive force, to move, along a linear axis 108, between a closed position, which is the position depicted in FIG. 1, and a plurality of open positions, one of which is depicted in FIG. 2. In the depicted embodiment the valve 102 is implemented using a pintle valve. It will be appreciated, however, that the valve 102 may be variously configured as any one of numerous valves that are configured to move along a linear axis.

The actuator 104 is coupled to the valve 102 and is configured, upon being appropriately energized, to supply the translational drive force to the valve 102. To implement this functionality, the depicted actuator 104 includes an electric motor 112 and a rotary-to-linear conversion mechanism 114. The electric motor 112 may be implemented using any one of numerous types of AC or DC motors now known or developed in the future including, for example, an AC induction motor or a brushed DC motor. In a preferred embodiment, however, the motor 112 is implemented using a brushless DC motor. No matter how the electric motor 112 is specifically implemented, it is configured to rotate about a rotational axis 116, and thereby supply a drive torque to the rotary-to-linear conversion mechanism 114.

The rotary-to-linear conversion mechanism 114 is coupled to, and receives the drive torque from, the electric motor 112, and is additionally coupled, via an output shaft 118, to the valve 102. As its nomenclature connotes, the rotary-to-linear conversion mechanism 114 is configured to convert the drive torque supplied from the electric motor 112 to the translational drive force, and supply the translational drive force, via the output shaft 118, to the valve 102 with no backlash (or at least substantially no backlash). Although the rotary-to-linear conversion mechanism 114 may be variously configured, a particular preferred embodiment is described in more detail further below.

As FIGS. 1 and 2 further depict, the valve control system 100 may additionally include a position sensor 122 and a motor control 106. The position sensor 122 is coupled to, and is configured to sense a position of, the output shaft 118. The position sensor 112 is additionally configured to supply a position signal representative of the sensed output shaft position. It will be appreciated that the position sensor 122 may be implemented using any one of numerous position sensors now known or developed in the future. It will additionally be appreciated that the system 100 may be implemented using more than one position sensor 122. In a particular preferred embodiment, the system 100 is implemented with a single position sensor, which is implemented using a relatively high-precision, differential variable reluctance transducer (DVRT). No matter the specific number and implementation, the position sensor 122 supplies the position signal to the motor control 106.

The motor control 106 is coupled to receive the position signal from the position sensor 122. The motor control 106 is additionally adapted to receive valve position commands 126 from a non-illustrated source. The motor control 106 is configured, in response to the valve position commands 126 and the position signal, to appropriately energize the electric motor 112 from a non-illustrated power source, such that the actuator 104 moves the valve 102 to the commanded position. It may thus be appreciated that the motor control 106 implements appropriate closed-loop position control of the output shaft 118 using the position signal supplied from the position sensor 122.

In addition to providing position loop closure, it will be appreciated that in a particular preferred embodiment, in which the electric motor 112 is implemented using a brushless DC motor, the position signal is also used to commutate the electric motor 112. This is because, at least in the particular preferred embodiment, a relatively high-accuracy position sensor 122 is used. Moreover, during system operation the electric motor 112 turns less than one revolution throughout the full stroke range of the actuator 104 and, as was mentioned above and will be described further below, the rotary-to-linear conversion mechanism 114 supplies the translation drive force to the valve 102 with no backlash (or at least substantially no backlash). As such, the sensed output shaft position is proportional to motor rotor position. This in turn means a separate motor rotor position sensor is not needed, which decreases overall cost and improves overall system reliability.

Figure 3:
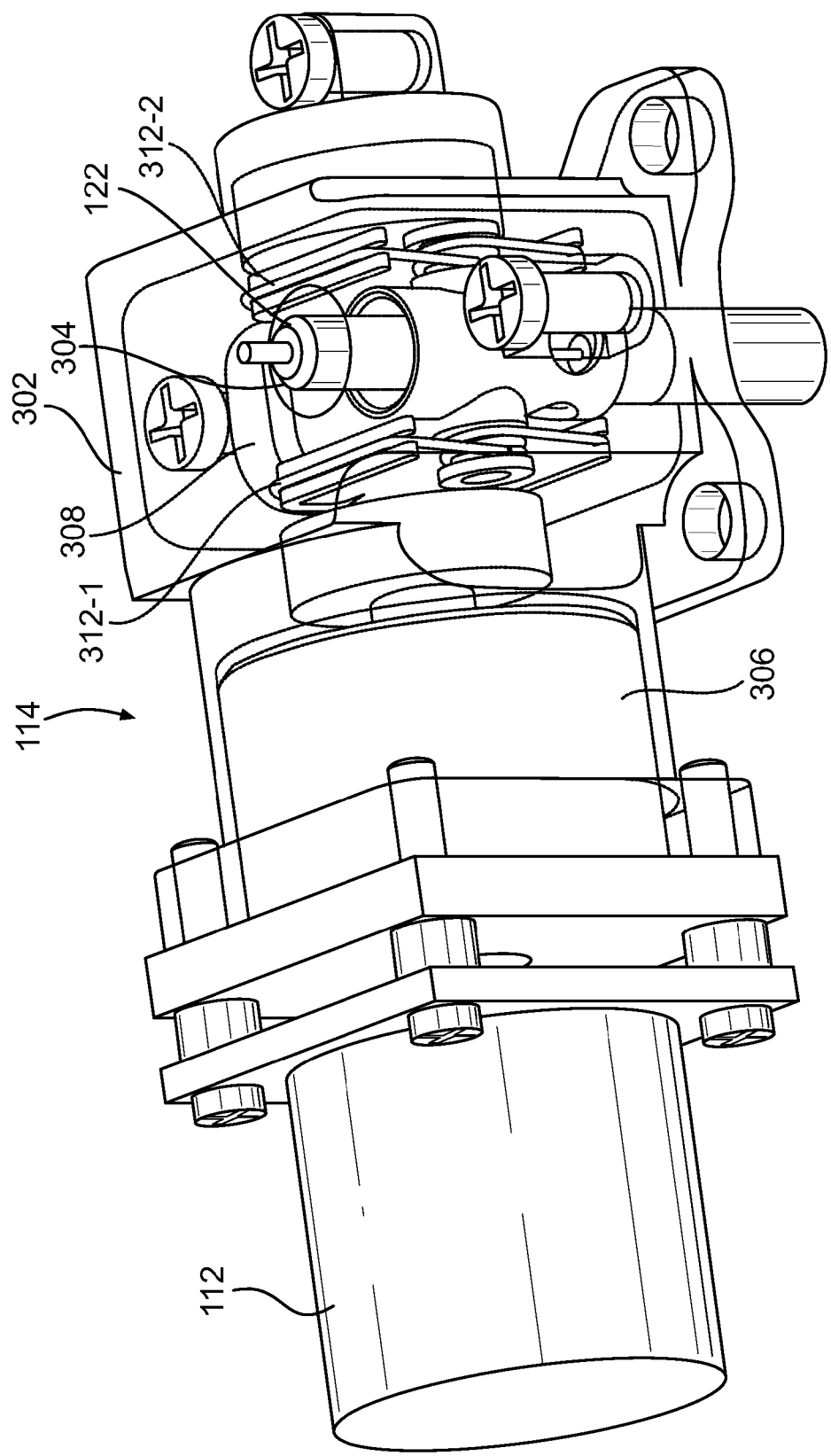
FIGS. 3-9 depict various views, both full and partial, of an exemplary physical implementation of an actuator that may be used to implement the system depicted in FIGS. 1 and 2.
Figure 4:
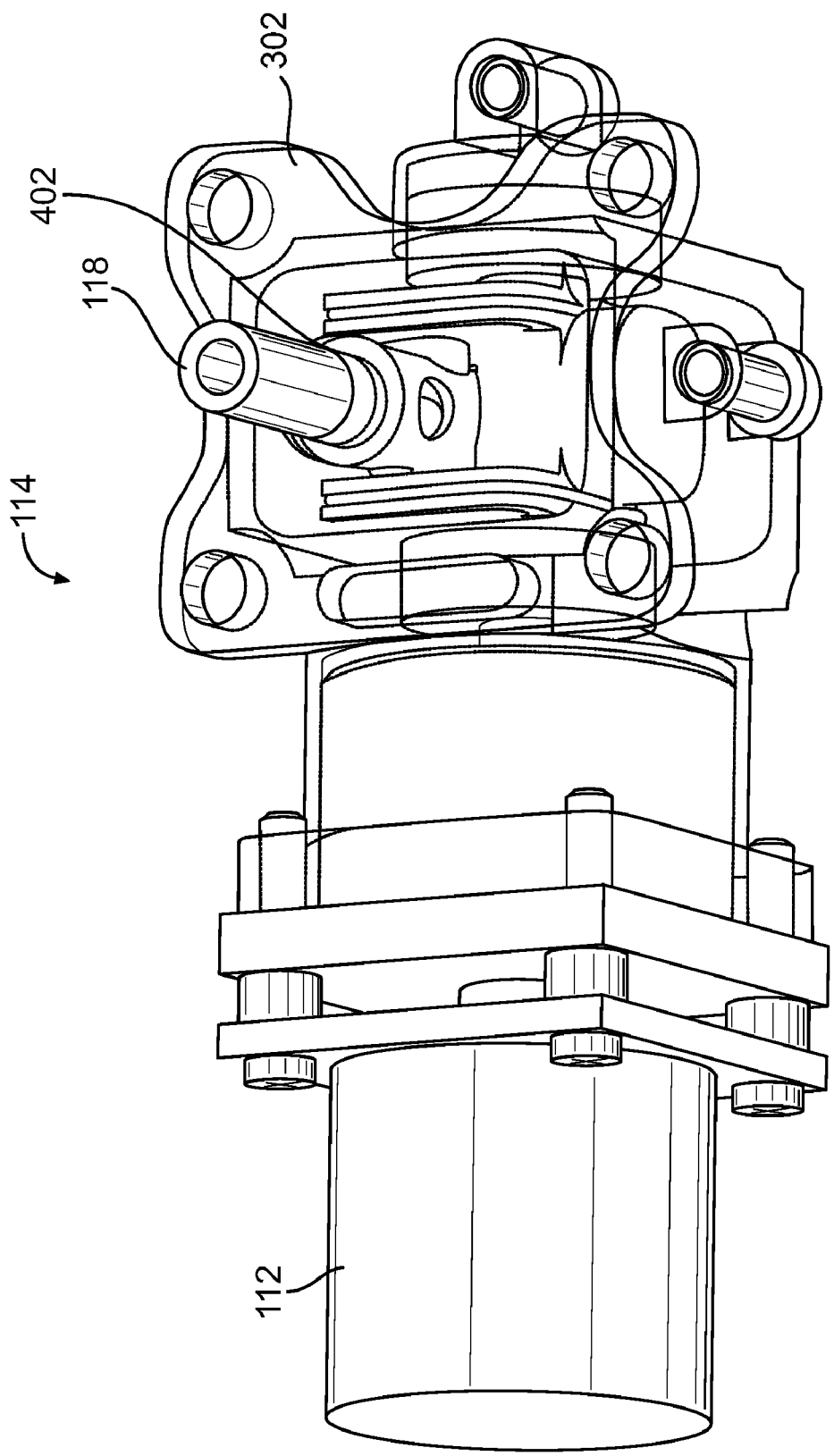

It was previously noted that the rotary-to-linear conversion mechanism 114 may be variously configured, and that a particular preferred embodiment would be described. Turning now to FIGS. 3-9, this description will be provided. Referring first to FIGS. 3 and 4, a particular preferred embodiment of the actuator 104 is depicted. The electric motor 112 is coupled to a portion of the linear-to-rotary conversion mechanism 114 and to a housing 302. The linear-to-rotary conversion mechanism 114 is disposed, at least partially, within the housing 302. In particular, it may be seen that a portion of the position sensor 122 and a portion of the output shaft 118 extend through appropriate openings 304 and 402, respectively, in the housing 302.

Figure 5:
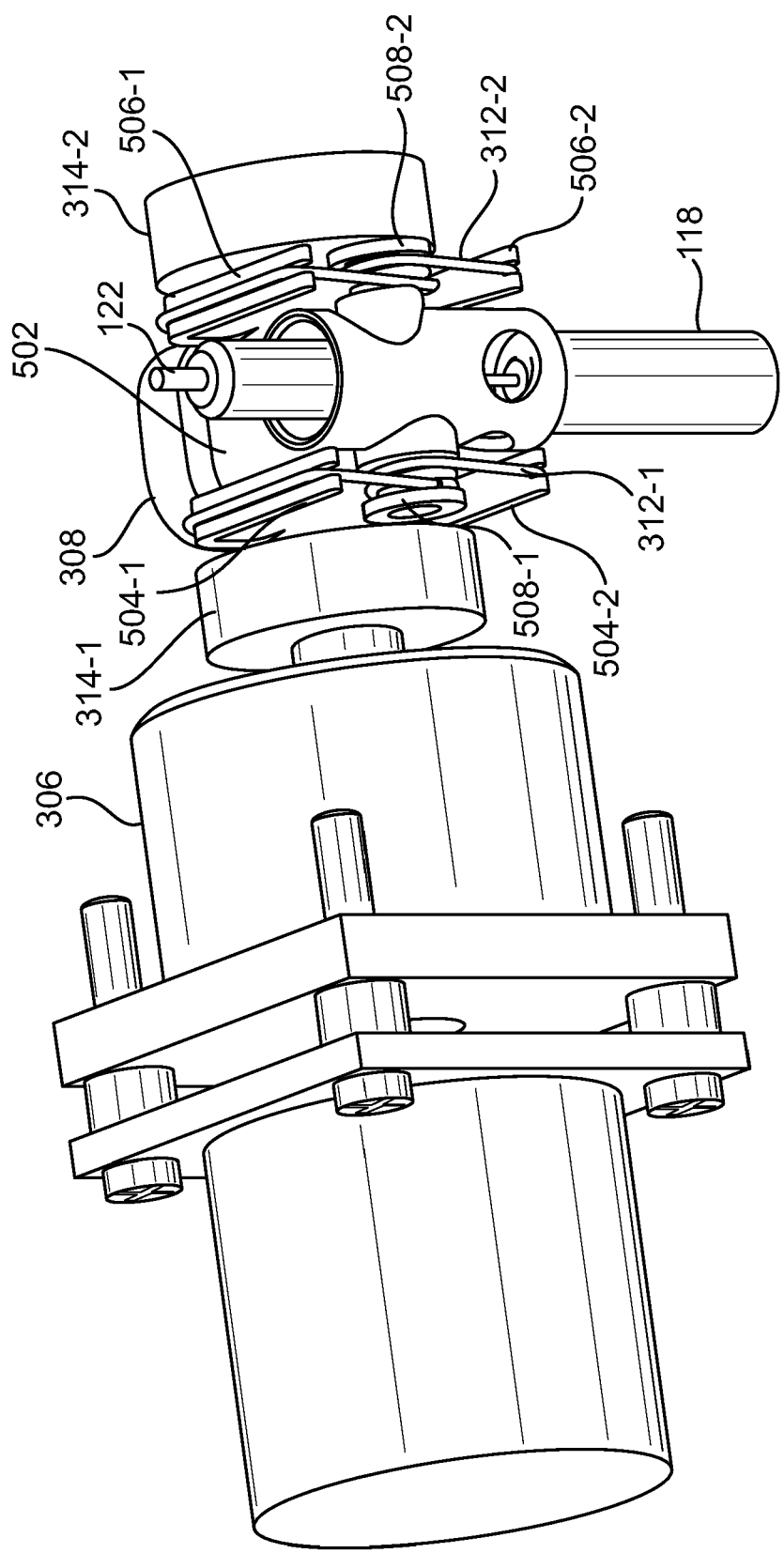
Figure 6:
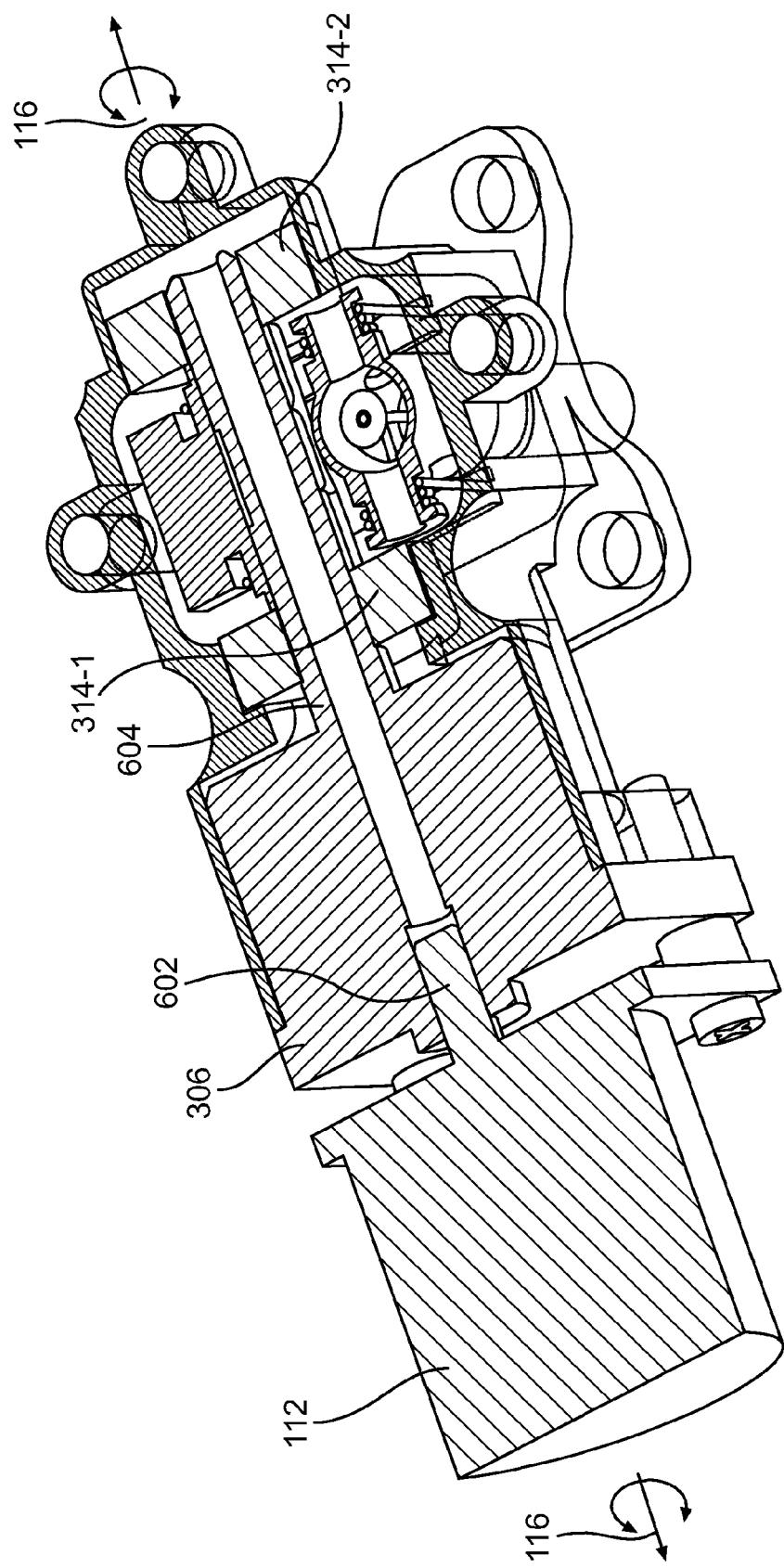

With continued reference to FIGS. 3 and 4, in combination now with reference to FIG. 5, it may additionally be seen that the preferred linear-to-rotary conversion mechanism 114 includes a harmonic drive gear train 306, a cable yoke 308, and a pair of cables 312-1, 312-2. The harmonic drive gear train 306 is coupled to receive the drive torque supplied from the electric motor 112 and is configured, upon receipt of the drive torque, to supply a reduced-speed drive torque. More specifically, as is depicted more clearly FIG. 6, the electric motor 112 includes a motor shaft 602 that extends into, and supplies the drive torque to, the harmonic drive gear train 306. In response to the torque supplied from the motor shaft 602, the harmonic drive gear train 306 supplies the drive torque, via an output member 604, to the cable yoke 308 at a significantly reduced rotational speed from that of the motor shaft 602. The output member 604 is rotationally mounted within the housing 302 via a plurality of bearings 314-1, 314-2.

Figure 10:
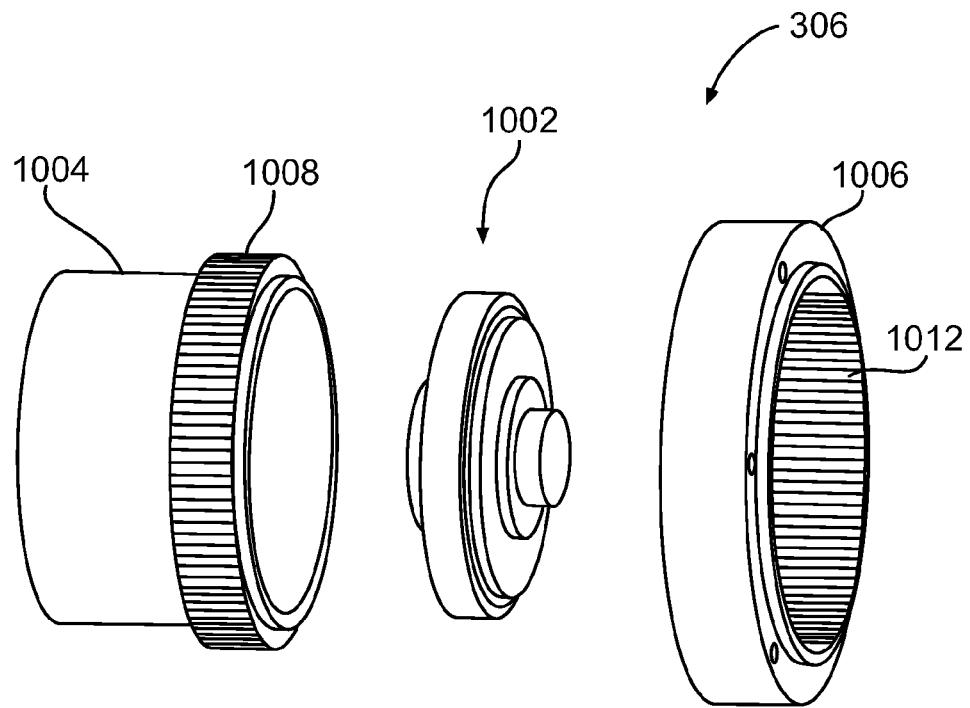
FIGS. 10 and 11 are exploded and cross section views of an exemplary harmonic drive gear train that may be used to implement the actuator depicted in FIGS. 3-9.
Figure 11:
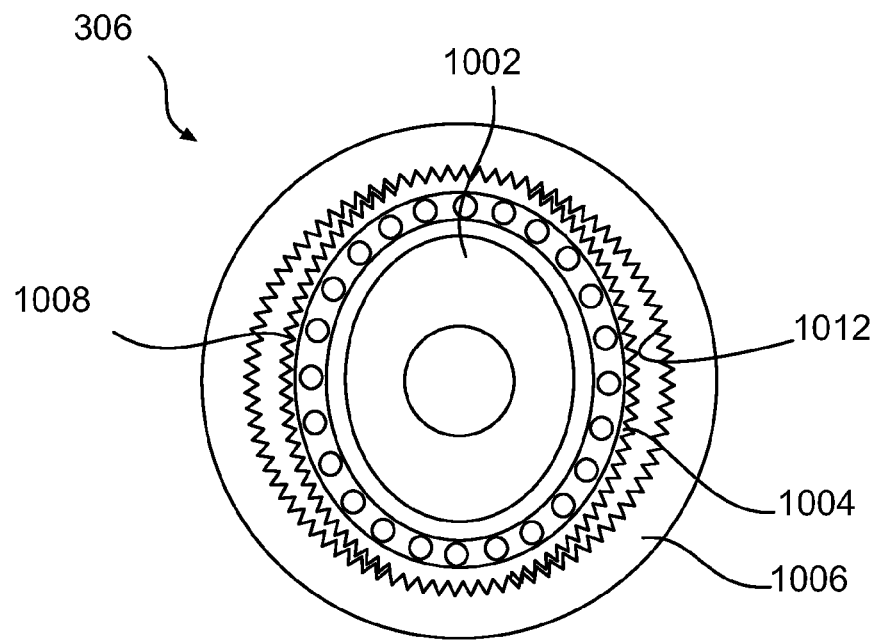

To implement the above-described rotational speed reduction, the harmonic drive gear train 306 includes a plurality of interconnected components (not shown in FIGS. 3-9). For completeness, an exemplary embodiment of these internal components will now be briefly described. In doing so, reference should be made to FIGS. 10 and 11, which depict exploded and end views, respectively, of an exemplary embodiment of the interconnected internal components of the harmonic drive gear train 306 are shown. The harmonic drive gear train 306, which may be physically implemented in any one of numerous structural configurations now known or developed in the future, includes a wave generator 1002, a flexspline 1004, and a circular spline 1006. The wave generator 1002 has an outer surface that is generally elliptically shaped. The wave generator 1002 is coupled to, and thus rotates with, the motor shaft 602.

The wave generator 1002 is disposed within the flexspline 1004, and is coupled to the output member 604. The flexspline 1004 is implemented as a relatively thin-walled cylinder, and includes a plurality of gear teeth 1008 formed on the outer surface of a portion thereof. The flexspline 1004 is configured such that it is radially compliant, yet torsionally stiff. Thus, as FIG. Y shows, when the wave generator 1002 is disposed within the flexspline 1004, the flexspline outer surface conforms to the same elliptical shape as the wave generator 1002.

The circular spline 1006 surrounds the flexspline 1004, and in the depicted embodiment is mounted against rotation. A plurality of gear teeth 1012 are formed into the inner surface of the circular spline 1006, and mesh with the flexspline gear teeth 1008 along the major axis of the ellipse. Because the flexspline 1004 has less gear teeth 1008 than the circular spline 1006, a reduction in rotational speed between the input and output of the harmonic drive gear train 306 is achieved. Although the difference in number of gear teeth may vary, in a typical configuration, there are two less flexspline gear teeth 1008 than circular spline gear teeth 1012.

Before returning to the description of the actuator 104, it will be appreciated that the above-described harmonic drive gear train 306 is merely exemplary of a particular embodiment, and that harmonic drive gear trains 306 of various other configurations and implementations could be used. Moreover, although the above-described harmonic drive gear train 306 is configured such that the flexspline 1004 is coupled to the output member 604, it will be appreciated that the harmonic drive gear train 306 could also be configured such that the circular spline 1006 is coupled to the output member 604.

Figure 7:
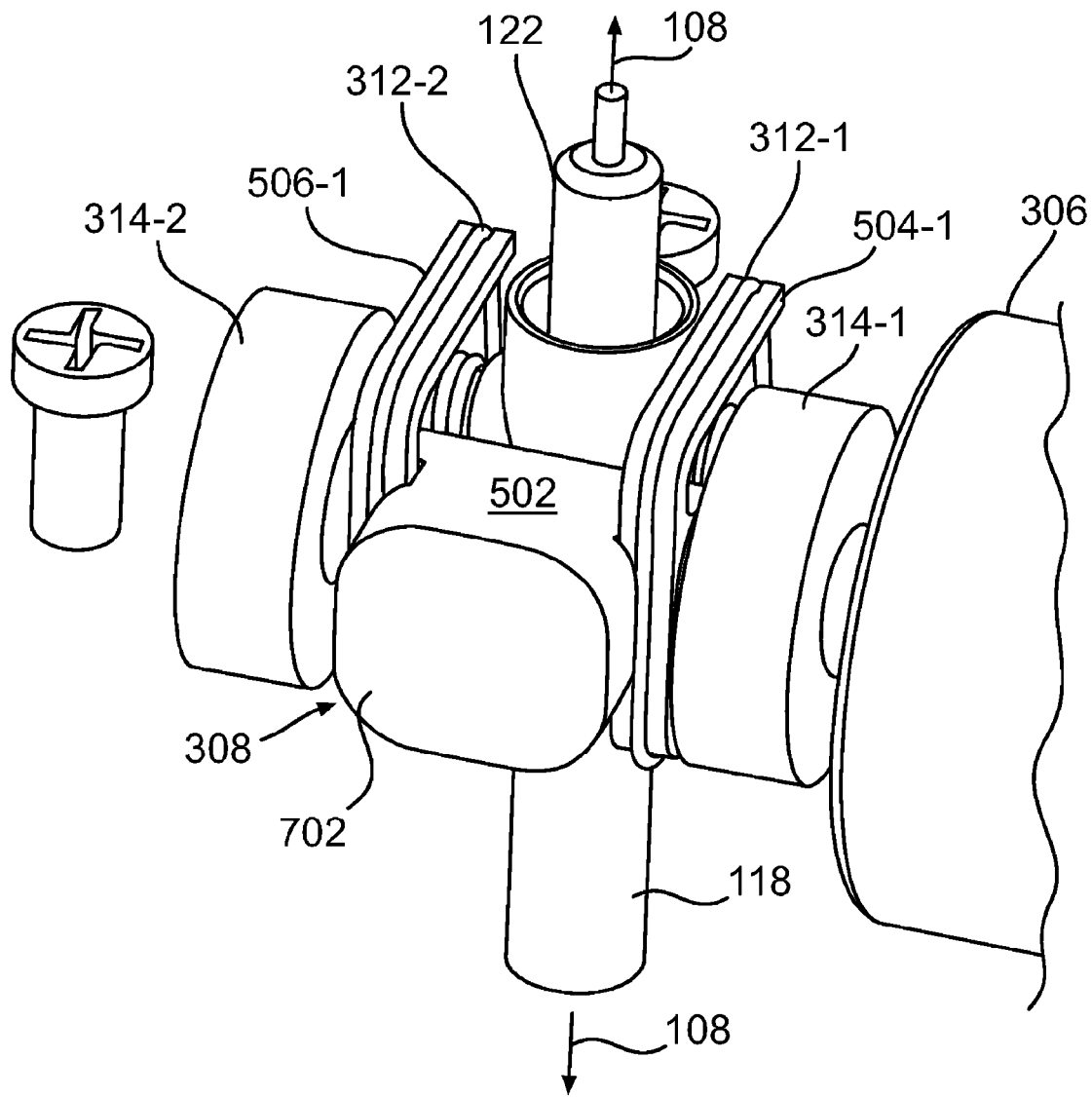

Returning now to description of the actuator 104, and with reference once again to FIG. 5, it may be seen that the cable yoke 308 is coupled to, and receives the reduced-speed drive torque from, the harmonic drive gear train 306. The cable yoke 308 is configured, upon receipt the reduced-speed drive torque, to rotate about the rotational axis 116. In the depicted embodiment this functionality is implemented by suitably mounting the cable yoke 308 on the output member 604, such that the cable yoke 308 is rotated commensurate with the output member 604. The cable yoke 308 includes a main body 502 and two sets of opposing yoke arms—a first set of arms 504-1, 504-2, and a second set of arms 506-1, 506-2—that extend from the main body xxx toward the output shaft 118. As FIG. 7 depicts most clearly, a counter balance mass 702 extends from the main body 502. The counter balance mass 702 may be integrally formed as part of the main body 502 or separately formed and then coupled thereto. In either case, the counter balance mass 702, if included, mass balances the output shaft 118.

Each of the cables 312-1, 312-2 is wound on a portion of the cable yoke 308 and around a portion of the output shaft 118. More specifically, one of the cables 312-1 is wound onto one end of the cable yoke main body 502 and onto the first set of arms 504-1, 504-2, and the other cable 312-2 is wound onto the opposing end of the cable yoke main body 502 and onto the second set of arms 506-1, 506-2. Each cable 312-1, 312-2 extends from the cable yoke 308, and is wrapped around a separate protrusion 508-1, 508-2 that extends perpendicularly from the output shaft 118 (see FIG. 7). In the depicted embodiment, each of the cables 312-1, 312-2 is wound twice around its associated protrusion 508-1, 508-2. It will be appreciated that the number of times the cables 312-1, 312-2 are wound around the respective protrusions 508-1, 508-2 may vary.

The cables 312-1, 312-2 may be implemented using any one of numerous suitable materials. In a particular preferred embodiment, the cables 312-1, 312-2 are implemented using metallic wires. No matter the particular material used, the cables 312-1, 312-2 are wound in pretension on the cable yoke 308 and around the output shaft protrusions 508-1, 508-2. Thus, the cables 312-1, 312-2 are continuously under load, which precludes backlash at the output shaft 118. Moreover, the cables 312-1, 312-2, upon rotation of the cable yoke 308, supply a drive force to the output shaft 118, which causes the output shaft 118 to translate along the linear axis 108 (see FIG. 7) and supply the translational drive force to the valve 102. Although the actuator 104 includes two cables 312-1, 312-2, it will be appreciated that it could include more or less than this number. Preferably, however, the actuator 104 includes at least two cables 312-1, 312-2 to provide suitable redundancy.

Figure 8:
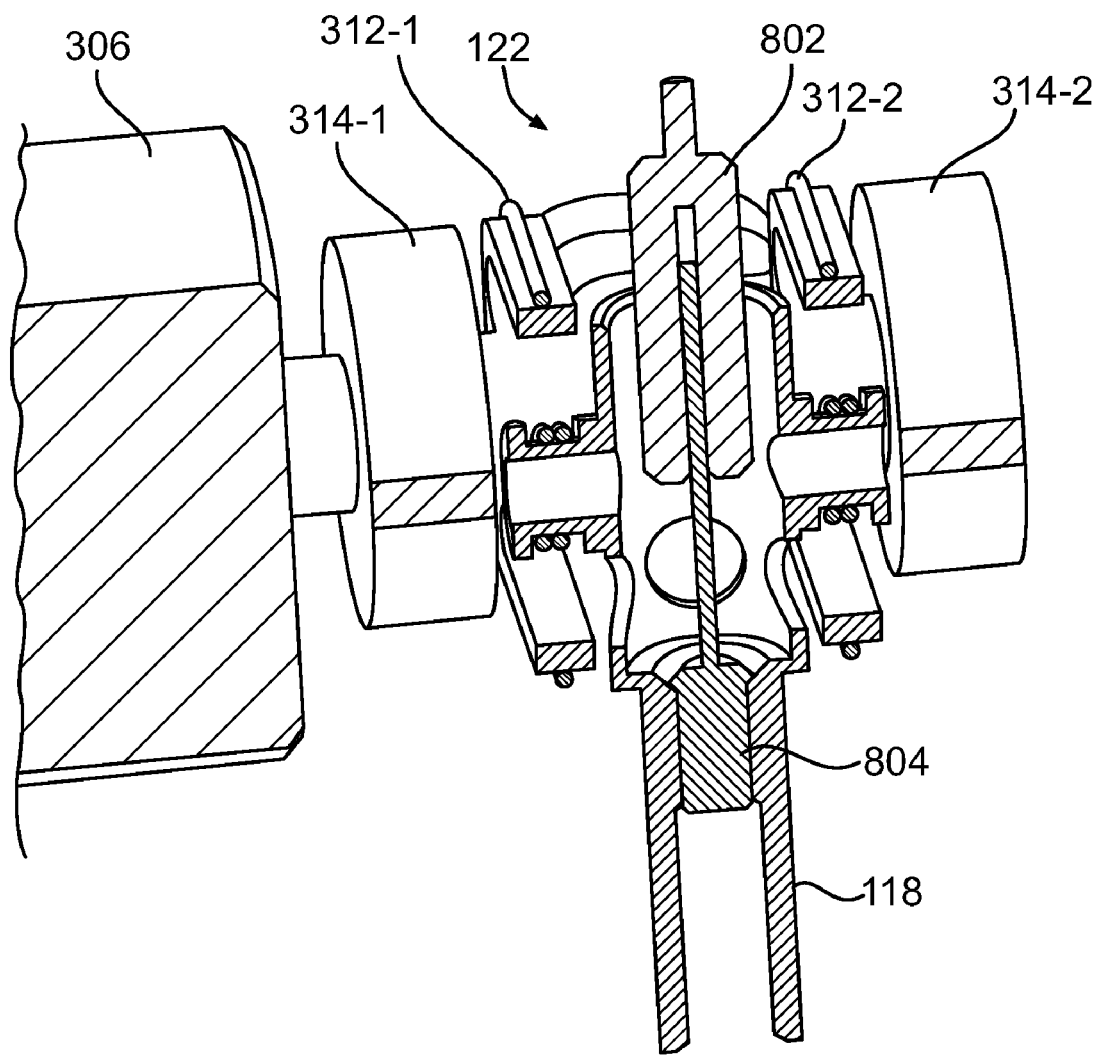
Figure 9:
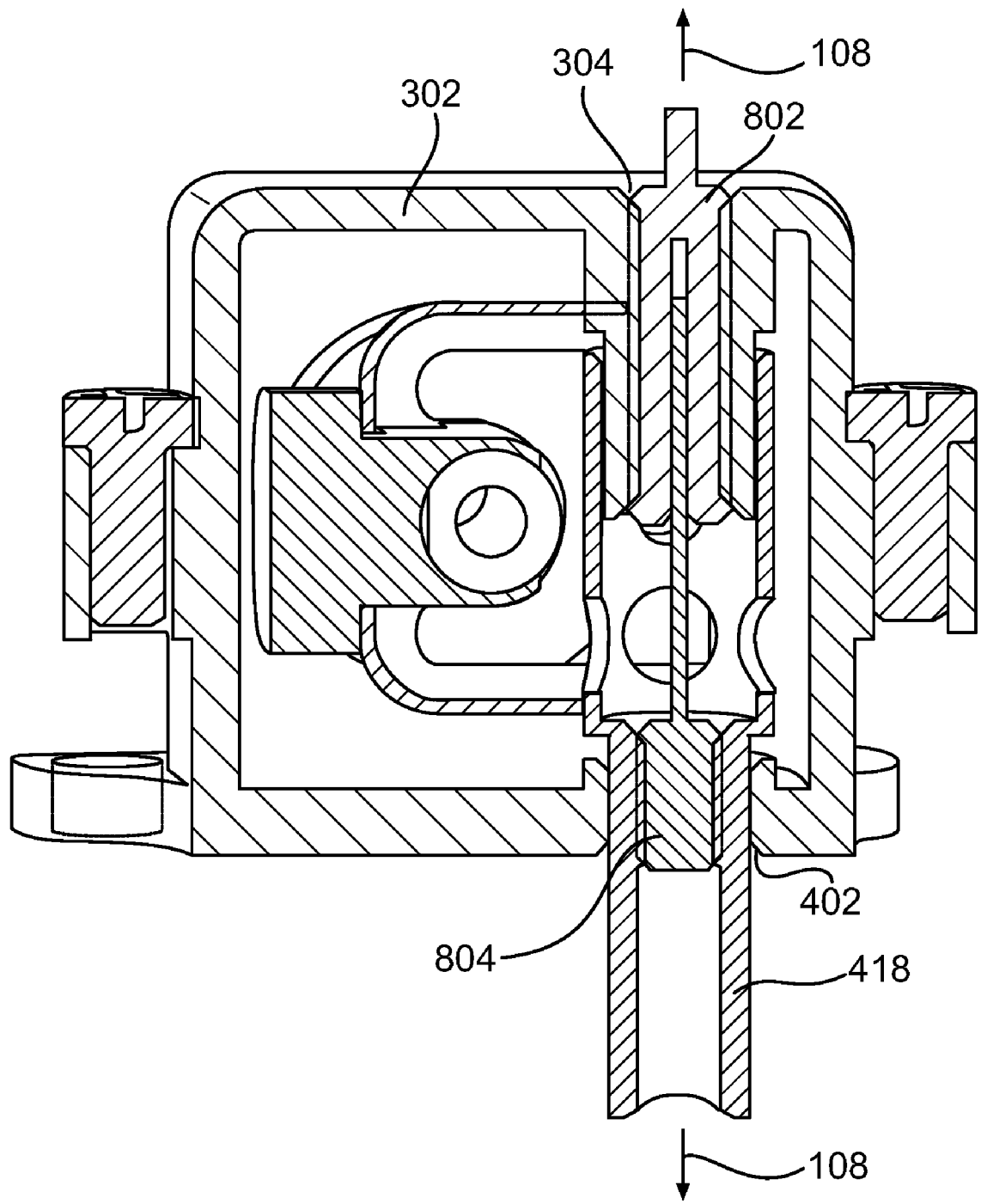

Turning briefly now to FIGS. 8 and 9, a particular configuration of the output shaft 118 and position sensor 122 is depicted. The position sensor 122 includes a fixed portion 802 and a movable portion 804. The fixed portion 802, as shown most clearly in FIG. 9, is fixedly coupled to the housing 302 and extends partially through one of the openings 304. The movable portion 804 is disposed within, and is coupled to, the output shaft 118. The movable portion 804 thus moves with the output shaft 118 along the linear axis 108. The movable portion 804 is also disposed partially within the fixed portion 802 and moves relative thereto.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An electromechanical actuator, comprising:
   an electric motor adapted to be selectively energized and configured, upon being energized to generate a drive torque;
   a cable yoke coupled to receive the drive torque and configured, upon receipt thereof, to rotate about a rotational axis;
   an output shaft coupled to receive a drive force and configured, upon receipt thereof, to translate along a linear axis that is disposed at least substantially perpendicular to the rotational axis; and
   a pair of cables, each cable wound, in pretension, on a portion of the cable yoke and around a portion of the output shaft, the pair of cables configured, upon rotation of the cable yoke, to supply the drive force to the output shaft.

2. The actuator of claim 1, further comprising a harmonic drive gear train coupled between the electric motor and the cable yoke.

3. The actuator of claim 1, further comprising:
a position sensor coupled to the output shaft and configured to sense a position of the output shaft and supply a position signal representative thereof.

4. The actuator of claim 1, further comprising:
a motor control coupled to receive the position signal from the position sensor and configured to implement closed-loop position control of the output shaft.

5. The actuator of claim 4, wherein:
the motor is a brushless DC motor; and
the motor control is further configured to commutate the brushless DC motor using the position signal.

6. The actuator of claim 1, further comprising:
a counter balance mass coupled to the cable yoke at a position that is diametrically opposed to that of the output shaft.

7. An electromechanical actuator, comprising:
a brushless DC electric motor adapted to be selectively energized and configured, upon being energized to generate a drive torque;
a harmonic drive gear train coupled to receive the drive torque from the motor and, upon receipt thereof, supply a reduced-speed drive torque;
a cable yoke coupled to receive the reduced-speed drive torque from the harmonic drive gear train and configured, upon receipt thereof, to rotate about a rotational axis;
an output shaft coupled to receive a drive force and configured, upon receipt thereof, to translate along a linear axis that is disposed at least substantially perpendicular to the rotational axis;
a pair of cables, each cable wound, in pretension, on a portion of the cable yoke and around a portion of the output shaft, the pair of cables configured, upon rotation of the cable yoke, to supply the drive force to the output shaft;
a position sensor coupled to the output shaft and configured to sense a position of the output shaft and supply a position signal representative thereof; and
a motor control coupled to receive the position signal from the position sensor and configured to commutate the brushless DC motor using the position signal.

8. The actuator of claim 7, wherein the motor control is further configured to use the position signal to implement closed-loop position control of the output shaft.

9. The actuator of claim 7, further comprising:
a counter balance mass coupled to the cable yoke at a position that is diametrically opposed to that of the output shaft.

10. A valve control system, comprising:
a valve coupled to receive a translational drive force and operable, upon receipt thereof, to selectively move, along a linear axis, between a closed position and a plurality of open positions; and
an actuator coupled to the valve and configured to supply the translational drive force thereto, the actuator comprising:
an electric motor adapted to be selectively energized and configured, upon being energized to generate a drive torque;
a cable yoke coupled to receive the drive torque and configured, upon receipt thereof, to rotate about a rotational axis;
an output shaft coupled to receive a drive force and configured, upon receipt thereof, to translate along the linear axis, the linear axis being disposed at least substantially perpendicular to the rotational axis; and
a pair of cables, each cable wound, in pretension, on a portion of the cable yoke and around a portion of the output shaft, the pair of cables configured, upon rotation of the cable yoke, to supply the drive force to the output shaft.

11. The system of claim 10, wherein the actuator further comprises a harmonic drive gear train coupled between the electric motor and the cable yoke.

12. The system of claim 10, wherein the actuator further comprises a position sensor coupled to the output shaft and configured to sense a position of the output shaft and supply a position signal representative thereof.

13. The system of claim 12, further comprising:
a motor control coupled to receive the position signal from the position sensor and configured to implement closed-loop position control of the output shaft.

14. The system of claim 13, wherein:
the motor is a brushless DC motor; and
the motor control is further configured to commutate the brushless DC motor using the position signal.

15. The system of claim 10, wherein the actuator further comprises a counter balance mass coupled to the cable yoke at a position that is diametrically opposed to that of the output shaft.

* * * * *